United States Patent [19]

Saruwatari et al.

[11] Patent Number: 5,795,278
[45] Date of Patent: Aug. 18, 1998

[54] NUMERICAL CONTROL EQUIPMENT FOR A PLURALITY OF SYSTEMS

[75] Inventors: Koji Saruwatari; Koji Shiraishi, both of Niwa-gun, Japan

[73] Assignee: Okuma Corporation, Nagoya, Japan

[21] Appl. No.: 858,451

[22] Filed: May 19, 1997

[30] Foreign Application Priority Data

May 24, 1996 [JP] Japan .................. 8-129493

[51] Int. Cl.[6] ................ B23Q 3/157; G05B 19/00
[52] U.S. Cl. ................ 483/4; 364/474.21; 483/38; 483/56; 483/58
[58] Field of Search .................. 483/4, 5, 6, 1, 483/8, 10, 11, 7, 38, 41, 54, 56, 47, 58; 364/474.21, 474.11, 474.15; 318/569, 600

[56] References Cited

U.S. PATENT DOCUMENTS

| | | | |
|---|---|---|---|
| 3,775,837 | 12/1973 | Tomita et al. | 483/7 |
| 3,806,788 | 4/1974 | Ullman et al. | 318/601 |
| 3,953,918 | 5/1976 | Bone et al. | 483/41 |
| 4,614,020 | 9/1986 | Kanada et al. | 483/4 |
| 4,616,322 | 10/1986 | Niwa | 364/474.21 |
| 4,905,369 | 3/1990 | Kawamura et al. | 483/54 |
| 5,300,006 | 4/1994 | Tanaica et al. | 483/56 |

*Primary Examiner*—William R. Briggs
*Attorney, Agent, or Firm*—Oliff & Berridge PLC

[57] ABSTRACT

A single driving system (4, 5, 6) is provided for a plurality of pairs of controlled systems and axis controllers (1, 12:2, 13). This driving system is connected to a required pair of the controlled systems and the axis controllers as needed using an axis changing device (3) and a changing controller (7). At this time, the shaft position data of the driving system, at the time when a controlled system is separated from the driving system, is stored in a first axis shaft position data storing device (8) or a second axis shaft position data storing device (11). When the connection is returned, an offset signal is sent to the changing controller (7) from a first axis shaft position offset calculator (9) or a second axis shaft position offset calculator (10). Thus, a plurality of controlled systems can be driven by a single driving system.

6 Claims, 5 Drawing Sheets

NUMERICAL CONTROL EQUIPMENT FOR A PLURALITY OF SYSTEMS

BACKGROUND OF THE INVENTION

1. Field of the Invention

The present invention relates to numerical control equipment for controlling machine tools. More particularly, the present invention relates to numerical control equipment for controlling a plurality of controlled systems such as tool changing devices and cam position changing devices.

2. Description of the Prior Arts

In numerical controls for machine tools, rotation of a main spindle, positioning of workpieces, tool changing, etc. are computer controlled. Because the relative position between the main spindle and the workpiece can be regulated by numerical control, machining is performed very accurately and efficiently.

However, this type of numerical control equipment should be provided with a plurality of independent driving systems for respectively controlling the rotation of the main spindle, tool changing devices, and other controlled systems.

FIG. 5 is a block diagram showing an example of conventional numerical control equipment.

A first axis controller 12 outputs a position command to a drive controller 6. The drive controller 6 controls a first axis controlled system 1 by driving an axis driving motor 4. An amount of movement of the first axis controlled system 1 is confirmed by the drive controller 6 on the basis of the shaft position data (the angular position data of the shaft of the axis driving motor 4) output from a shaft position detector 5. Furthermore, a moved position of the first axis controlled system 1 is confirmed by the first axis controller 12 on the basis of the shaft position data output from the drive controller 6.

A tool changer will be given as an example of the first axis controlled system 1. Other controlled systems (for example, a second axis controlled system) will be necessary for the numerical control equipment apart from the first axis controlled system 1. A cam position changing device will be given as an example of such a second axis controlled system. A second axis controller 13 outputs a position command to a drive controller 20 in order to control the second axis controlled system 2. The drive controller 20 controls the second axis controlled system 2 by driving an axis driving motor 18. An amount of movement of the second axis controlled system 2 is confirmed by the drive controller 20 on the basis of the shaft position data output from a shaft position detector 19. Furthermore, a moved position of the second axis controlled system 2 is confirmed by the second axis controller 13 on the basis of the shaft position data output from the drive controller 20.

As mentioned above, in the conventional numerical control equipment shown in FIG. 5, two types of controlled systems, such as a tool changer and a cam position changing device, are controlled with separate independent drive systems.

In the above-mentioned numerical control equipment for controlling machine tools, a plurality of driving systems such as driving controllers, driving motors, position detectors, etc. are necessary even if the control of the machine tools is such that a plurality of the controlled systems do not operate simultaneously. Because driving controllers, driving motors and position detectors are expensive, use of a large number of such devices makes the numerical control equipment expensive.

SUMMARY OF THE INVENTION

The present invention solves such a problem. An object of the present invention is to provide such numerical control equipment that does not need expensive driving controllers, driving motors and position detectors on every axis (every controlled system) in controlling a plurality of controlled systems which do not operate simultaneously.

In numerical control equipment of the present invention in which a plurality of controlled systems are controlled, the shaft position at the time when a controlled system is separated from the axis driving motor is stored in a shaft position data storing device. When the controlled systems are changed, a shaft position offset is calculated on the basis of the present shaft position detected by the shaft position detector and the shaft position at the time when the controlled system to be connected next was separated from the axis driving motor, which is stored in the shaft position storing device.

The driving controller controls the drive of the axis driving motor on the basis of the shaft position corrected on the basis of the offset calculated by a shaft position offset calculator.

Consequently, it is possible to drive a plurality of controlled systems by a single set of an axis driving motor, a shaft position detector, and a driving controller. Therefore, it is not necessary to provide a plurality of expensive driving controllers, driving motors, and position detectors in order to control a plurality of controlled systems which do not operate simultaneously. Consequently, inexpensive numerical control equipment can be obtained without deteriorating its functions.

It is favorable to adopt such a constitution that the respective position commands corresponding to the respective systems of a plurality of controlled systems are respectively output from a plurality of axis controllers.

Tool changers, cam position changing devices, etc. can be expected as examples of a plurality of the controlled systems.

It is favorable to memorize the conversion factor which converts the amount of the shaft movement in a controlled system to the amount of the shaft movement in another controlled system in question by integrating the amount of the shaft movement in the controlled system which is moving while other controlled systems are separated from the axis driving motor. An amount of the offset when the controlled system has been connected to the axis driving motor can be calculated on the basis of the conversion factor. In this way, amounts of the shaft movements can be understood accurately, even if controlled systems having different speed changing ratios are driven.

DESCRIPTION OF THE PREFERRED EMBODIMENTS

Figure 1:
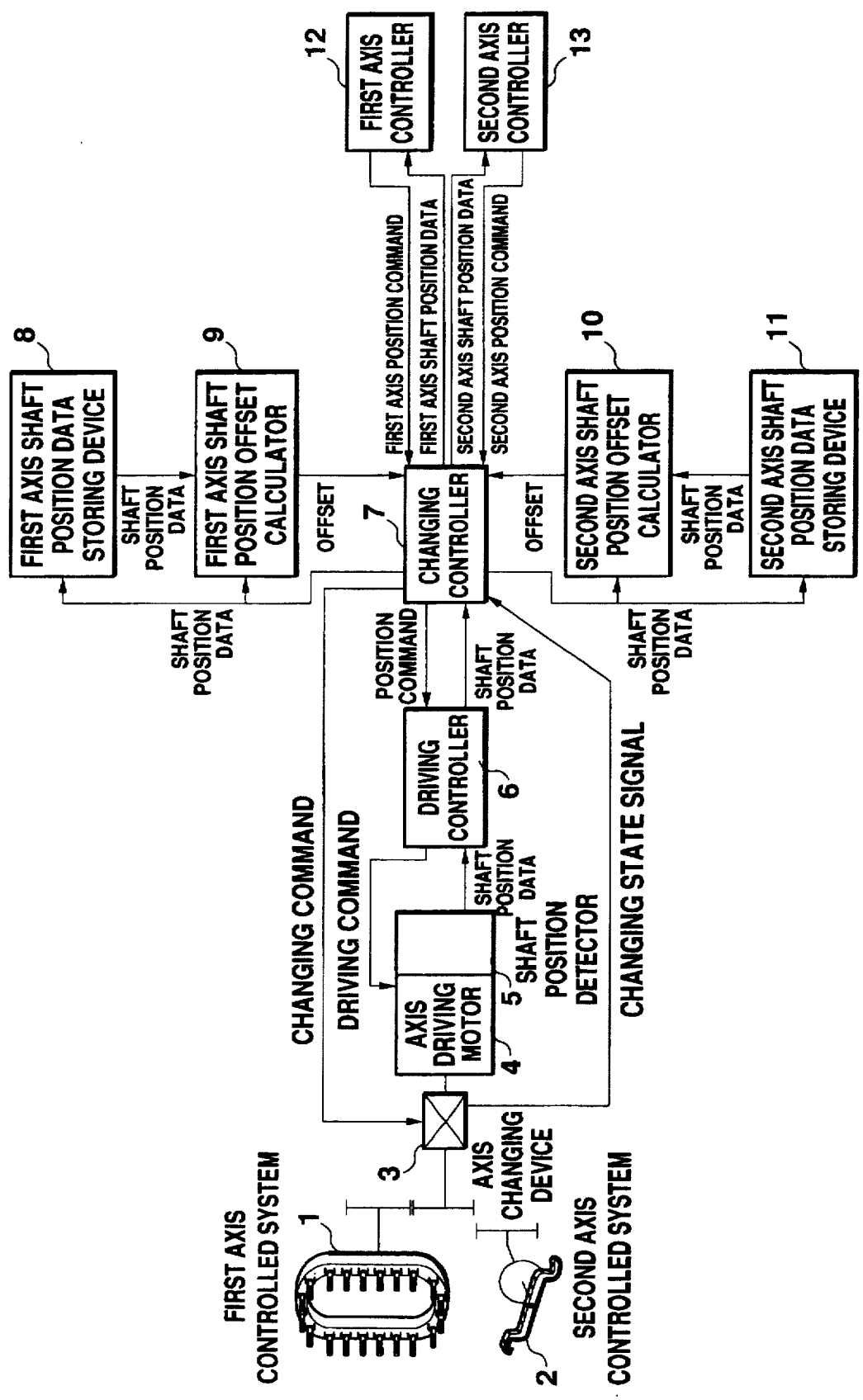
FIG. 1 is a block diagram showing a first embodiment of numerical control equipment in the present invention.

Preferred embodiments of the present invention will now be described with reference to the accompanying drawings.

3

Parts explained before in the drawings are designated by the same numerals and symbols, and further explanations are omitted.

Embodiment 1.

FIG. 1 is a block diagram showing a first embodiment of numerical control equipment in the present invention.

Figure 5:
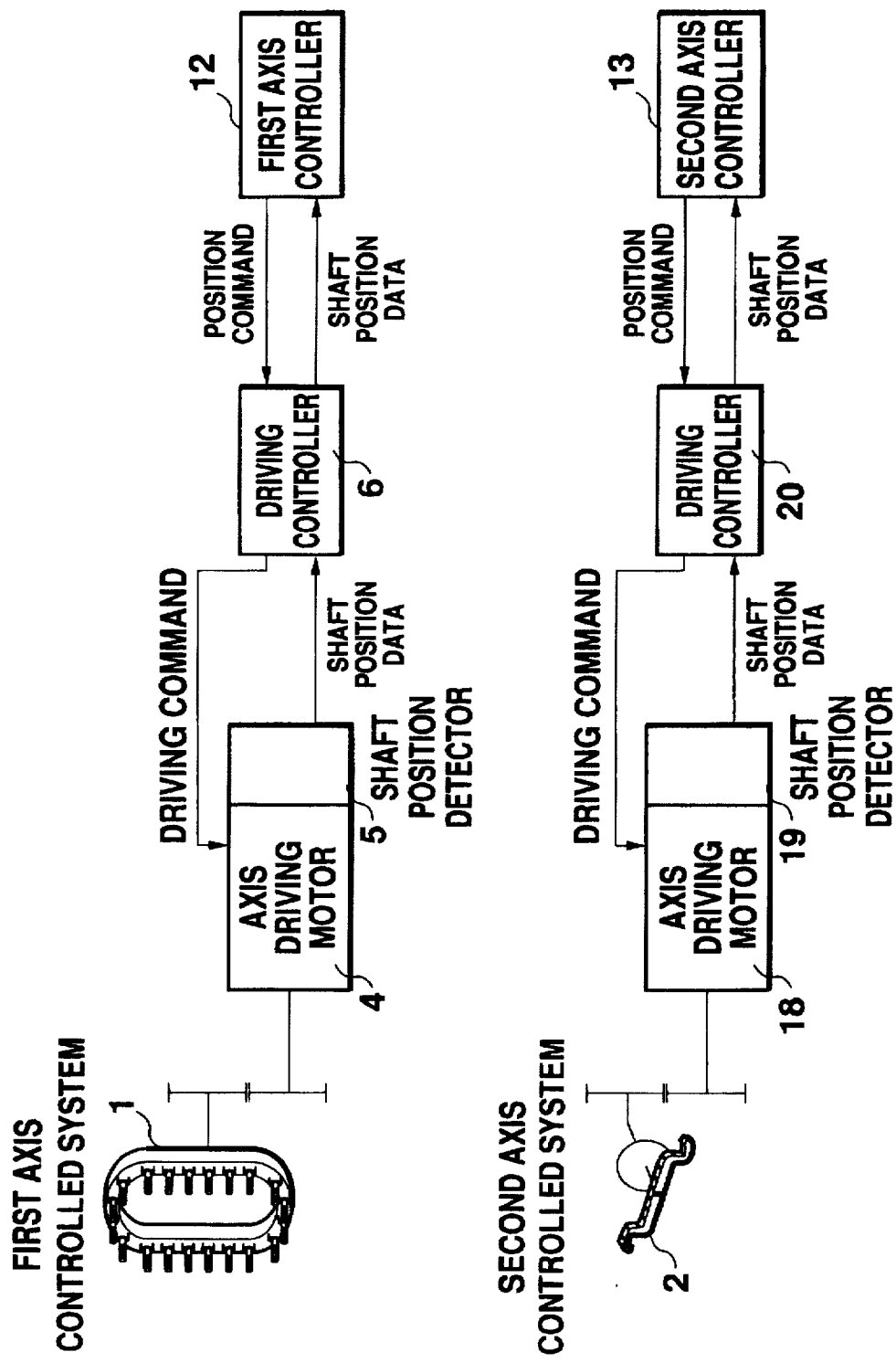
FIG. 5 is a block diagram showing an example of conventional numerical control equipment.

A plurality of controlled systems are provided in this embodiment like the conventional equipment shown in FIG. 5. Two types of controlled systems, that is, a tool changer as a first axis controlled system 1 and a cam position changing device as a second axis controlled system 2, are provided in FIG. 1. A first axis controller 12 and a second axis controller 13 are provided in order to output necessary position commands to the controlled systems 1, 2 respectively. In other words, there are two cases of the pair of a controlled system and an axis controller.

In this embodiment, only one driving system is provided for these two cases of the pair of a controlled system and an axis controller. This single driving system is selectively connected to either of the pairs of the controlled system and the axis controller as needed. Therefore, the equipment can be simplified. Because tool changing and cam position changing are not usually executed at the same time, even only one driving system is capable of performing excellent driving control for both of the tool changing and the cam position changing.

It is clear from FIG. 1 that the driving system comprises an axis driving motor 4, a shaft position detector 5, and a driving controller 6. The axis driving motor 4 gives a necessary amount of movement to a selected controlled system through the driving command output from the driving controller 6. The shaft position of the axis driving motor 4 is always detected by the shaft position detector 5. The detected shaft position data is transferred to the driving controller 6 as signals.

An axis changing device 3 is provided on the driving system and selectively connects the axis driving motor 4 to the respective controlled systems 1 and 2. Similarly, the driving controller 6 is selectively connected to either of the axis controllers 12, 13 using a changing controller 7.

The changing controller 7 judges whether the first axis controlled system 1 is connected to the axis driving motor 4 or not, on the basis of a changing state signal output from the axis changing device 3, when a first axis position command for driving the first axis controlled system 1 is output from the first axis controller 12. When the first axis controlled system 1 is not connected to the axis driving motor 4, the changing controller 7 connects the axis driving motor 4 to the first axis controlled system 1 using the axis changing device 3. The present shaft position data output from the shaft position detector 5 is read into the changing controller 7 via the driving controller 6. This shaft position data is stored in a second axis shaft position data storing device 11. The second axis shaft position data storing device 11 stores this shaft position data as the axial position data of the second axis at the time the second axis controlled system 2 is separated from the axis driving motor 4.

As mentioned above, the changing controller 7 outputs a changing command for the first axis controlled system 1 to the axis changing device 3. The axis changing device 3 connects the axis driving motor 4 to the first axis controlled system 1.

The changing controller 7 confirms completion of the changing by a changing state signal output from the axis changing device 3, reads the present shaft position data output from the shaft position detector 5 via the driving controller 6, and outputs the read shaft position data to a first axis shaft position offset calculator 9.

4

The first axis shaft position offset calculator 9 reads a value stored in a first axis shaft position data storing device 8 as the shaft position data of the first axis when the first axis controlled system 1 is separated from the axis driving motor 4. A first axis shaft position offset is calculated on the basis of the present shaft position data and the shaft position data of the first axis controlled system 1 which was stored in the first axis shaft position storing device 8 when the first axis controlled system 1 was separated from the axis driving motor 4. That is to say, the first axis shaft position offset is recalculated in order to cancel the movement of the shaft position detector 5 while the second axis controlled system 2 is being controlled. The first axis shaft position offset is a vector showing the relationship between both shaft positions. The changing controller 7 calculates the shaft position data of the first axis by adding the first axis shaft position offset to the shaft position data output from the driving controller 6 concerning the shaft movement. That is to say, although the shaft position data is output to the shaft position of the first axis stored in the first axis shaft position data storing device 8, the present shaft position is not the shaft position of the first axis. Therefore, after the shaft position has been corrected by the offset, the corrected position command is generated by adding the converted shaft position to the shaft position data output from the driving controller 6.

In this way, it becomes possible to drive the first axis controlled system 1 using a single set of the driving controller 6, the axis driving motor 4, and the shaft position detector 5. After that, the first axis controlled system 1 is driven according to the first axis position command output from the first axis controller 12, and the shaft position data of the first axis controlled system 1 is fed back to the first axis controller 12.

In a similar way, the changing controller 7 connects the axis driving motor 4 to the second axis controlled system 2 by the axis changing device 3, when a second axis position command for driving the second axis controlled system 2 is output from the second axis controller 13 and the second axis controlled system 2 is not connected to the axis driving motor 4. At this time, the shaft position data output from the shaft position detector 5 is read via the driving controller 6 and is stored in the first axis shaft position data storing device 8. The first axis shaft position data storing device 8 stores this shaft position data as the shaft position data of the first axis at the time when the first axis controlled system 1 was separated from the axis driving motor 4. As mentioned above, the changing controller 7 outputs a changing command for the second axis controlled system 2 to the axis changing device 3, and the axis changing device 3 connects the axis driving motor 4 to the second axis controlled system 2.

The changing controller 7 confirms the completion of the changing by a changing state signal output from the axis changing device 3, and reads the present shaft position data output from the shaft position detector 5 via the driving controller 6, and outputs the read shaft position data to a second axis shaft position offset calculator 10. The second axis shaft position offset calculator 10 calculates the present shaft position data taking the value stored in the second axis shaft position data storing device 11 when the second axis controlled system 2 was separated from the axis driving motor 4 as the shaft position of the second axis, and recalculates the second axis shaft position offset in order to cancel the movement of the shaft position detector 5 while the first axis controlled system 1 is being controlled. The changing controller 7 calculates the shaft position data of the second axis by adding the second axis shaft position offset to the shaft position data output from the driving controller 6.

In this way, it becomes possible to drive the second axis controlled system 2. After that, the second axis controlled system 2 is driven according to the second axis shaft position command output from the second axis controller 13, and the shaft position data of the second axis controlled system 2 is fed back to the second axis controller 13.

Figure 3:
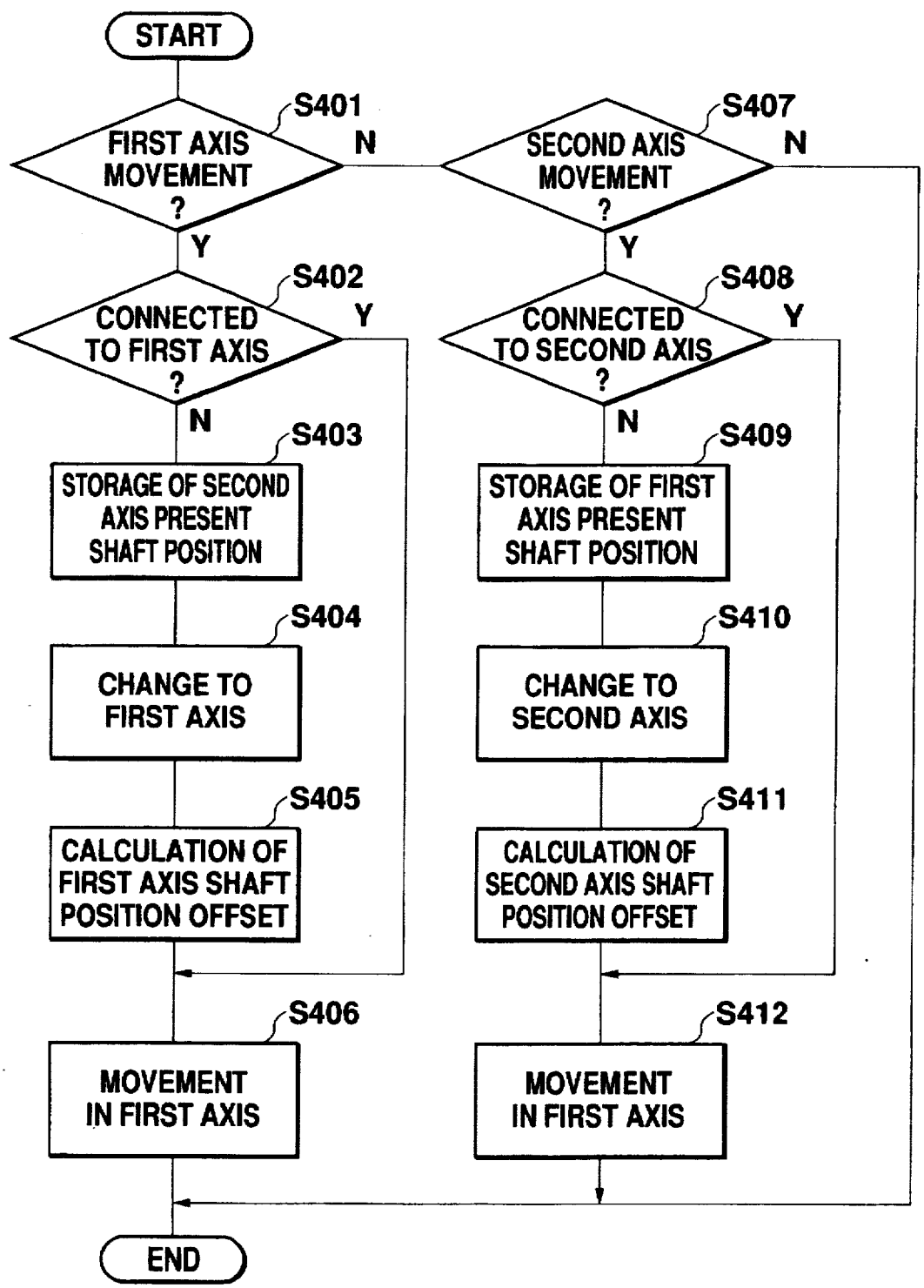
FIG. 3 is a first flow chart showing the processing procedures in the first embodiment of the present invention.

Operations of the first embodiment of the present invention will now be described with reference to the flow chart shown in FIG. 3. The changing controller 7 judges whether a first axis driving command exists or not (step 401). If the first axis driving command exists, then the process advances to the step 402. If the first axis driving command does not exist, then the process advances to the step 407. At the step 402, the changing controller 7 judges whether the first axis controlled system 1 is connected to the axis driving motor 4 or not. If the first axis controlled system 1 is connected to the axis driving motor 4, then the process advances to the step 406. If the first axis controlled system 1 is not connected to the axis driving motor 4, then the changing controller 7 reads the shaft position data output from the shaft position detector 5 via the driving controller 6. This shaft position data is stored as the shaft position data at the time when the control was changed from the second axis controlled system 2 to the first axis controlled system 1 (step 403), and the connection is changed to the first axis controlled system 1 (step 404).

Next, the first axis shaft position offset is calculated in order to cancel the movement of the shaft position detector 5 during the control of the second axis controlled system 2 on the basis of the present shaft position data and the shaft position data of the first axis stored in the first axis shaft position data storing device 8 at the time when the control was changed from the first axis controlled system 1 to the second axis controlled system 2 (step 405). The shaft position data of the first axis is calculated from this offset and the present shaft position data. After that, the first axis controlled system 1 is driven according to the first axis position command output from the first axis controller 12 (step 406), and the process ends after the drive has been finished.

At the step 407, the changing controller 7 judges whether the driving command for the second axis exists or not. If the driving command for the second axis exists, then the process advances to the step 408. If the driving command for the second axis does not exist, the process ends. At the step 408, the changing controller 7 judges whether the second axis controlled system 2 is connected to the axis driving motor 4 or not. If the second axis controlled system 2 is connected to the axis driving motor 4, then the process advances to the step 412.

If the second axis controlled system 2 is not connected to the axis driving motor 4, then the changing controller 7 reads the shaft position data output from the shaft position detector 5 via the driving controller 6. This shaft position data is stored as the shaft position data of the first axis at the time when the control was changed from the first axis controlled system 1 to the second axis controlled system 2 (step 409), and the connection is changed to the second axis controlled system 2 (step 410). Next, the second axis shaft position offset is calculated in order to cancel the movement of the shaft position detector 5 during the control of the first axis controlled system 1 on the basis of the present shaft position data and the shaft position data of the second axis stored in the second axis shaft position data storing device 11 at the time when the control was changed from the second axis controlled system 2 to the first axis controlled system 1 (step 411). The shaft position data of the second axis is calculated from this offset and the present shaft position data. After that, the second axis controlled system 2 is driven according to the second axis position command output from the second axis controller 13 (step 412), and the process ends after the drive has been finished.

Embodiment 2.

Figure 2:
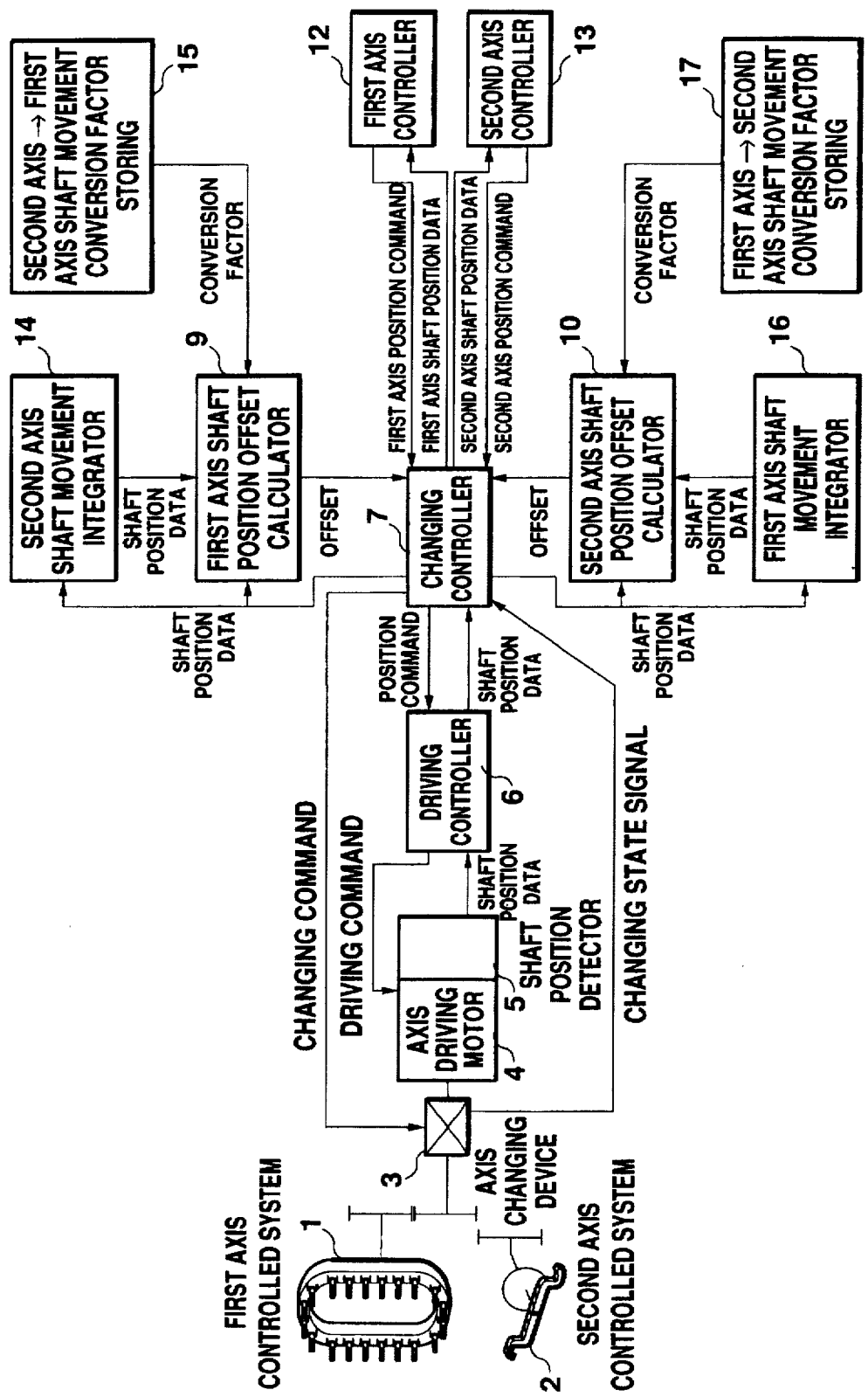
FIG. 2 is a block diagram showing a second embodiment of numerical control equipment in the present invention.

FIG. 2 is a block diagram showing another embodiment of numerical control equipment in the present invention.

When a first axis position command for driving the first axis controlled system 1 is sent from the first axis controller 12, and the first axis controlled system 1 is not connected to the axis driving motor 4, the changing controller 7 outputs a changing command to the axis changing device 3 in order to change the connection from the second axis controlled system 2 to the first axis controlled system 1. The axis changing device 3 changes the connection to the first axis controlled system 1 according to the changing command output from the changing controller 7. The changing controller 7 confirms the completion of the change through a changing state signal output from the axis changing device 3, and reads the present shaft position data output from the shaft position detector 5 via the driving controller 6, and outputs the read shaft position data to the first axis shaft position offset calculator 9.

On the other hand, a second axis shaft movement integrator 14 integrates the amount of movement of the second axis controlled system 2 during the interval from the change of the first axis controlled system 1 to the second axis controlled system 2 until the rechange of the second axis controlled system 2 to the first axis controlled system 1. A second axis→first axis shaft movement conversion factor storing device 15 stores a second axis→first axis shaft movement conversion factor as a factor for converting the movement in the second axis controlled system 2 to the movement in the first axis. This second axis→first axis shaft movement conversion factor is calculated by (Speed changing ratio in the first axis)/(Speed changing ratio in the second axis), and is set by a data inputting device (not shown in the figure) and stored in the second axis→first axis shaft movement conversion factor storing device 15.

The first axis shaft position offset calculator 9 converts the movement of the second axis during the control of the second axis controlled system 2 to the movement of the first axis controlled system 1 using the movement data output from the second axis shaft movement integrator 14 and the conversion factor output from the second axis→first axis shaft movement conversion factor storing device 15. The first axis shaft position offset calculator 9 recalculates the first axis shaft position offset on the basis of this converted movement and the present shaft position data in order to cancel the movement of the shaft position detector 5 during the control of the second axis controlled system 2. The changing controller 7 generates the shaft position data of the first axis by adding the first axis shaft position offset to the shaft position data output from the driving controller 6. In this way, it becomes possible to drive the first axis controlled system 1. After that, the first axis controlled system 1 is driven according to the first axis position command output from the first axis controller 12, and the shaft position data of the first axis controlled system 1 is fed back to the first axis controller 12. The shaft position data during the movement of the first axis controlled system 1 is integrated by a first axis shaft movement integrator 16.

In a similar way, when a second axis position command for driving the second axis controlled system 2 is sent from the second axis controller 13, and the second axis controlled system 2 is not connected to the axis driving motor 4, the changing controller 7 outputs a changing command to the axis changing device 3 in order to change the connection from the first axis controlled system 1 to the second axis controlled system 2.

The axis changing device 3 changes the connection to the second axis controlled system 2 according to the changing command output from the changing controller 7. The changing controller 7 confirms the completion of the change by a changing state signal output from the axis changing device 3, and reads the present shaft position data output from the shaft position detector 5 via the driving controller 6, and outputs the read shaft position data to the second axis shaft position offset calculator 10.

On the other hand, a first axis shaft movement integrator 16 integrates the amount of movement of the first axis controlled system 1 during the interval from the change of the second axis controlled system 2 to the first axis controlled system 1 until the rechange of the first axis controlled system 1 to the second axis controlled system 2. A first axis→second axis shaft movement conversion factor storing device 17 stores a first axis→second axis shaft movement conversion factor as a factor for converting the movement in the first axis controlled system 1 to the movement in the second axis. This first axis→second axis shaft movement conversion factor is calculated by (Speed changing ratio in the second axis)/(Speed changing ratio in the first axis), and is set and stored in the first axis→second axis shaft movement conversion factor storing device 17 via a data inputting device (not shown in the figure).

The second axis shaft position offset calculator 10 converts the movement of the first axis during the control of the first axis controlled system 1 to the movement of the second axis controlled system 2 using the movement data output from the first axis shaft movement integrator 16 and the conversion factor output from the first axis→second axis shaft movement conversion factor storing device 17. The second axis shaft position offset calculator 10 recalculates the second axis shaft position offset on the basis of this converted movement and the present shaft position data in order to cancel the movement of the shaft position detector 5 during the control of the first axis controlled system 1.

The changing controller 7 calculates the shaft position data of the second axis by adding the second axis shaft position offset to the shaft position data output from the driving controller 6. In this way, it becomes possible to drive the second axis controlled system 2. After that, the second axis controlled system 2 is driven according to the second axis position command output from the second axis controller 13, and the shaft position data of the second axis controlled system 2 is fed back to the second axis controller 13. The shaft position data during the movement of the second axis controlled system 2 is integrated by the second axis shaft movement integrator 14.

Figure 4:
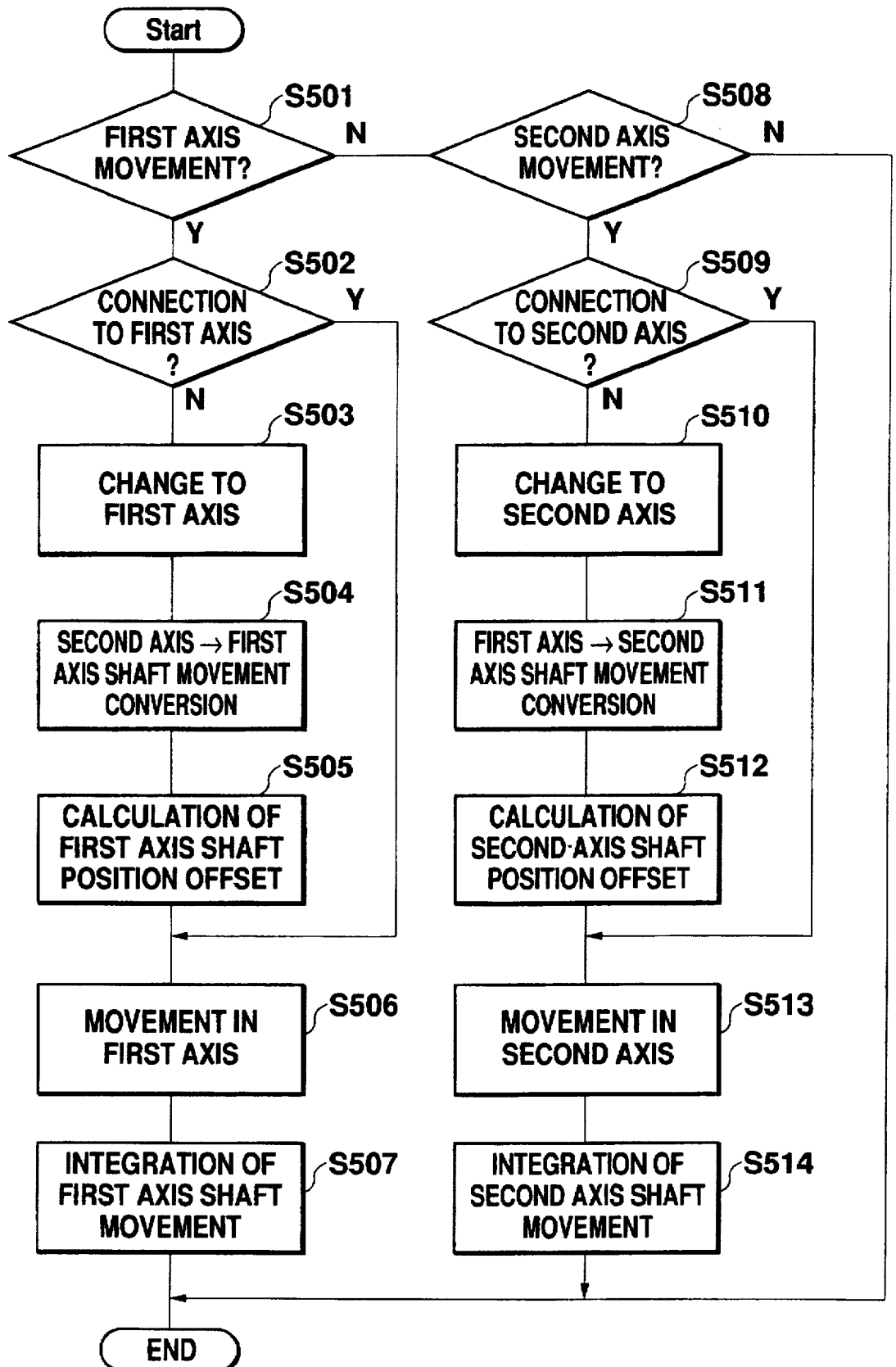
FIG. 4 is a second flow chart showing the processing procedures in the second embodiment of the present invention.

Operations of the second embodiment of the present invention will now be described with the reference to the flow chart shown in FIG. 4.

The changing controller 7 judges whether a driving command for the first axis exists or not (step 501). If the driving command for the first axis exists, then the process advances to the step 508. At the step 502, the changing controller 7 judges whether the first axis controlled system 1 is connected to the axis driving motor 4 or not. If the first axis controlled system 1 is connected to the axis driving motor 4, then the process advances to the step 506. If the first axis controlled system 1 is not connected to the axis driving motor 4, then the connection is changed to the first axis controlled system 1 (step 503). Next, the amount of movement of the second axis during the control of the second axis controlled system 2 is converted to the movement of the first axis controlled system 1 on the basis of the movement data output from the second axis shaft movement integrator 14 and the conversion factor output from the second axis→first axis shaft movement conversion factor storing device 15 (step 504). The first axis shaft position offset is calculated in order to cancel the movement of the shaft position detector 5 during the control of the second axis controlled system 2 on the basis of this converted movement and the present shaft position data (step 505). The shaft position data of the first axis is calculated from this offset and the present shaft position data. After that, the first axis controlled system 1 is driven according to the first axis position command output from the first axis controller 12 (step 506). The process ends after integrating this driven movement by the first axis shaft movement integrator 16. At the step 508, the changing controller 7 judges whether a driving command for the second axis exists or not. If the driving command for the second axis exists, then the process advances to the step 509. If the driving command for the second axis does not exist, then the process ends. At the step 509, the changing controller 7 judges whether the second axis controlled system 2 is connected to the axis driving motor 4 or not. If the second axis controlled system 2 is connected to the axis driving motor 4, then the process advances to the step 513. If the second axis controlled system 2 is not connected to the axis driving motor 4, then the connection is changed to the second axis controlled system 2 (step 510). Next, the amount of movement of the first axis during the control of the first axis controlled system 1 is converted to the movement of the second axis controlled system 2 on the basis of the movement data of the first axis movement integrator 16 and the conversion factor output from the first axis→second axis shaft movement conversion factor storing device 17 (step 511). The second axis shaft position offset is calculated in order to cancel the movement of the shaft position detector 5 during the control of the first axis controlled system 1 on the basis of this converted movement and the present shaft position data (step 512). The shaft position data of the second axis is calculated from this offset and the present shaft position data. After that, the second axis controlled system 2 is driven according to the second axis position command from the second axis controller 13 (step 513). The process ends after integrating this driven movement by the second axis shaft movement integrator 14.

As mentioned above, the second axis→first axis shaft movement conversion factor storing device 15 and the first axis→second axis shaft movement conversion factor storing device 17 are provided in the second embodiment of the present invention. These conversion factors are used to correct the effects of speed changing ratios in the respective axes. Therefore, the movement of an axis while the driving system drives another axis can be detected together with the speed changing ratios in the drive of both axes. Thus, even if speed changing ratios in both axes are different, it is possible to get an exact offset value for correcting the shaft positions. Consequently, it is possible to drive two controlled systems having different speed changing ratios using only one driving system.

What is claimed is:

1. Numerical control equipment for controlling a plurality of controlled systems, comprising:

an axis driving motor for driving a plurality of controlled systems a shaft position detector for detecting an angular position of a shaft of the axis driving motor;

a driving controller for controlling the drive of the axis driving motor;

an axis changing device for selectively connecting the axis driving motor to the respective controlled systems;

a changing controller for selectively connecting the driving controller to the respective axis controllers;

a shaft position data storing device for storing the shaft position at the time when one controlled system was separated from the axis driving motor; and a shaft position offset calculator for calculating a shaft position offset on the basis of a present shaft position detected by the shaft position detector when the connection of the controlled systems is changed by the axis changing device and the shaft position stored in the shaft position data storing device at the time when the controlled system to be connected next was separated from the axis driving motor;

wherein the driving controller controls the drive of the axis driving motor on the basis of the shaft position corrected by the offset calculated by the shaft position offset calculator.

2. Numerical control equipment according to claim 1, comprising:

a plurality of axis controllers which are provided for the respective controlled systems and output the position commands for the corresponding controlled systems;

wherein the driving controller controls the axis driving motor according to the position command on the basis of the shaft position corrected by the offset.

3. Numerical control equipment according to claim 2, wherein a plurality of the controlled systems comprise tool changers and cam position changing devices.

4. Numerical control equipment according to claim 1, further comprising:

a shaft movement integrator for integrating the shaft movement of a controlled system which is moving while other controlled systems are separated from the axis driving motor; and a shaft movement conversion factor storing device for storing a conversion factor for converting the shaft movement in other controlled systems to the shaft movement in a controlled system in question;

wherein an offset is calculated on the basis of the conversion factor when a controlled system is connected to the axis driving motor.

5. Numerical control equipment according to claim 4, wherein the conversion factors are determined on the basis of speed changing ratios between the movements of the axis driving motor and one of a plurality of controlled systems when the controlled system is driven.

6. Numerical control equipment according to claim 4, wherein a plurality of the controlled systems comprise tool changers and cam position changing devices.

* * * * *